United States Patent
Muramatsu et al.

(10) Patent No.: US 10,982,717 B2
(45) Date of Patent: Apr. 20, 2021

(54) STRUCTURE WITH THRUST BEARING

(71) Applicant: Honda Motor Co., Ltd., Tokyo (JP)

(72) Inventors: Isamu Muramatsu, Saitama (JP); Mariko Shibamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 253 days.

(21) Appl. No.: 15/921,664

(22) Filed: Mar. 15, 2018

(65) Prior Publication Data

US 2018/0266490 A1 Sep. 20, 2018

(30) Foreign Application Priority Data

Mar. 15, 2017 (JP) .............................. JP2017-049519

(51) Int. Cl.
| | | |
|---|---|---|
| *F16H 57/04* | (2010.01) | |
| *F16C 33/66* | (2006.01) | |
| *F16H 57/08* | (2006.01) | |
| *F16C 19/30* | (2006.01) | |
| *F16H 3/66* | (2006.01) | |

(52) U.S. Cl.
CPC .......... *F16C 33/6659* (2013.01); *F16C 19/30* (2013.01); *F16H 57/043* (2013.01); *F16H 57/0471* (2013.01); *F16H 57/0479* (2013.01); *F16H 57/0486* (2013.01); *F16H 57/08* (2013.01); *F16C 2361/61* (2013.01); *F16H 3/66* (2013.01); *F16H 2200/0069* (2013.01); *F16H 2200/2012* (2013.01); *F16H 2200/2046* (2013.01); *F16H 2200/2048* (2013.01);
(Continued)

(58) Field of Classification Search
CPC .. F16C 19/30; F16C 33/6659; F16C 33/6677; F16C 2361/61; F16H 57/043; F16H 57/0471; F16H 57/0479; F16H 57/0482; F16H 57/0484; F16H 57/0486; F16H 57/08
See application file for complete search history.

(56) References Cited

U.S. PATENT DOCUMENTS 7,967,713 B2 * 6/2011 Haupt ................. F16H 57/0427
475/160

FOREIGN PATENT DOCUMENTS

| CN | 1573170 | 2/2005 |
|---|---|---|
| CN | 102713356 | 10/2012 |

(Continued)

OTHER PUBLICATIONS

"Office Action of Japan Counterpart Application," with English translation thereof, dated Sep. 4, 2018, p. 1-p. 6.

(Continued)

*Primary Examiner* — Erin D Bishop
(74) *Attorney, Agent, or Firm* — JCIPRNET

(57) ABSTRACT

An annular first thrust bearing (30) includes a first race (30a) which is in contact with a sun gear (Sb), a second race (30b) which is in contact with a ring gear side member (20a), and a rolling body (30c) disposed therebetween, and the second race has a flange portion protruding radially outward. A second connection member (21) is disposed on a radially outer side of the first thrust bearing (30) to face the second race (30b), and a restricting portion (21a) is disposed at a position facing the first race (30a) or the rolling body (30c) on the rolling element (30c) side of the second race (30b). A distal end of the restricting portion (21a) is located radially inward of a distal end of the flange portion (30d).

2 Claims, 6 Drawing Sheets

(52) U.S. Cl.
CPC ............... *F16H 2200/2066* (2013.01); *F16H 2200/2082* (2013.01)

(56) References Cited

FOREIGN PATENT DOCUMENTS

| | | |
|---|---|---|
| CN | 202812020 | 3/2013 |
| CN | 103429931 | 12/2013 |
| JP | H02248755 | 10/1990 |
| JP | H0536160 | 5/1993 |
| JP | 2014-181743 | 9/2014 |

OTHER PUBLICATIONS

Office Action of China Counterpart Application, with English translation thereof, dated Aug. 17, 2020, pp. 1-11.

* cited by examiner

| | C1 | C2 | C3 | B1 | B2 | B3 | F1 | Gear shift ratio | Common ratio |
|---|---|---|---|---|---|---|---|---|---|
| Rvs | | | ○ | | ○ | | L | 4.008 | |
| 1st | | | | ○ | (○) | | R/L | 5.233 | |
| | | | | | | | | | 1.554 |
| 2nd | | ○ | | ○ | ○ | | R | 3.367 | |
| | | | | | | | | | 1.465 |
| 3rd | | | ○ | ○ | ○ | | R | 2.298 | |
| | | | | | | | | | 1.348 |
| 4th | | ○ | ○ | ○ | | | R | 1.705 | |
| | | | | | | | | | 1.251 |
| 5th | ○ | | (○) | ○ | | | R | 1.363 | |
| | | | | | | | | | 1.363 |
| 6th | ○ | ○ | ○ | | | | R | 1.000 | |
| | | | | | | | | | 1.273 |
| 7th | ○ | | ○ | | ○ | | R | 0.786 | |
| | | | | | | | | | 1.196 |
| 8th | ○ | ○ | | | ○ | | R | 0.657 | |
| | | | | | | | | | 1.126 |
| 9th | ○ | | | | ○ | ○ | R | 0.584 | |
| | | | | | | | | | 1.120 |
| 10th | ○ | ○ | | | | ○ | R | 0.520 | |

FIG. 4

STRUCTURE WITH THRUST BEARING

CROSS-REFERENCE TO RELATED APPLICATION

This application claims the priority of Japan patent application serial no. 2017-049519, filed on Mar. 15, 2017. The entirety of the above-mentioned patent application is hereby incorporated by reference herein and made a part of this specification.

BACKGROUND

Technical Field

The disclosure relates to a structure with a thrust bearing, which has the thrust bearing disposed between two members.

Description of Related Art

Conventionally, as a structure with a thrust bearing, there is known a structure including a first member and a second member (for example, a sun gear and a carrier of a planetary gear mechanism) relatively rotatable about the same rotational central axial line, and an annular thrust bearing disposed between the first member and the second member.

As a thrust bearing in this type of structure with a thrust bearing, there is known a structure including an annular first race which is in contact with the first member, an annular second race which is in contact with the second member, and a rolling body disposed between the first race and the second race (for example, refer to Patent Document 1).

In the thrust bearing described in Patent Document 1, both of the first race and the second race are formed as L-shaped members each of which has a cross-sectional shape taken along a central axial line and configured as a longitudinal portion and a short portion. Both of the first race and the second race are assembled so that the longitudinal portions and the short portions are in contact only with the same member (for example, one of the sun gear and the carrier of the planetary gear mechanism).

PATENT DOCUMENTS

[Patent Document 1] Japanese Unexamined Patent Application Publication No. 2014-181743

However, when the first race and the second race are incorrectly assembled, the first race and the second race may come into contact with different members according to positions thereof specifically, for example, a surface of the longitudinal portion of the first race on a side opposite to the short portion may come into contact with the first member which is originally intended to be in contact with the first race, and a distal end of the short portion of the first race may come into contact with the second member which should not originally come into contact with the first race.

As described above, in the case in which the first race or the second race is assembled to come into contact with different member, when the member to which the thrust bearing is assembled relatively rotates, an excessive force may be applied to the first race or the second race, or wear due to abrasion may occur.

SUMMARY

An aspect of the disclosure is to provide a structure with a thrust bearing, in which it is possible to prevent erroneous assembling of a first race and a second race constituting the thrust bearing.

In an embodiment of the disclosure, a structure with a thrust bearing of the disclosure, which has a first member (for example, a sun gear Sb in the embodiment, the same below) and a second member (for example, a ring gear side member 20a in the embodiment, the same below) configured to be relatively rotatable about the same rotational central axial line, and an annular thrust bearing (for example, a first thrust bearing 30 in the embodiment, the same below) disposed between the first member and the second member, includes a supply mechanism (for example, an input shaft 11 in the embodiment, the same below) configured to supply a lubricating fluid to an inside of the thrust bearing, a member to be supplied (for example, a second connecting member 21 in the embodiment, the same below) to which the lubricating fluid discharged from the thrust bearing is supplied, and a restricting member (for example, a restricting portion 21a in the embodiment, the same below), wherein the thrust bearing includes an annular first race (for example, a first race 30a in the embodiment, the same below) which is in contact with the first member, an annular second race (for example, a second race 30b in the embodiment, the same below) which is in contact with the second member, and a rolling body (for example, a rolling body 30c in the embodiment, the same below) disposed between the first race and the second race, the member to be supplied is disposed radially outward of the thrust bearing to face the second race, the restricting member is disposed radially outward of the thrust bearing and also at a position facing the first race or the rolling body on a rolling body side of the second race, the second race has a bearing side protruding portion (for example, a flange portion 30d in the embodiment, the same below) configured to protrude radially outward, and at least a part of a portion of the restricting member which faces the first race or the rolling body is located radially inward of a distal end of the bearing side protruding portion.

BRIEF DESCRIPTION OF THE DRAWINGS

FIG. 4 is an explanatory view illustrating an engagement state of each engagement mechanism in each gear shift stage of the transmission of FIG. 2.

DESCRIPTION OF THE EMBODIMENTS

Figure 1:
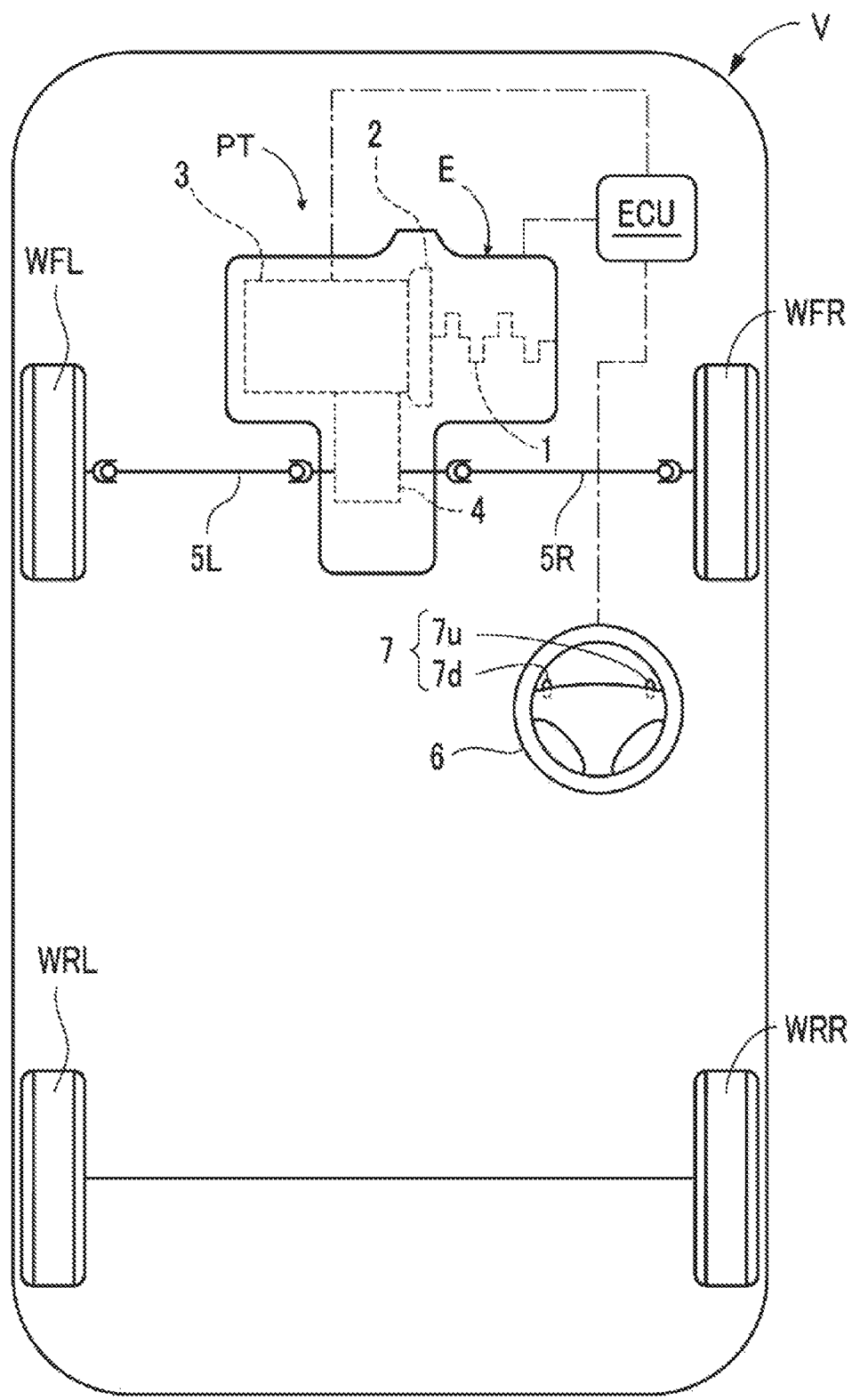
FIG. 1 is an explanatory view schematically illustrating a vehicle including a structure with a thrust bearing according to an embodiment.

As described above, in the structure with a thrust bearing of the disclosure, the restricting member is disposed radially outward of the thrust bearing and also at a position facing the first race or the rolling body on the rolling body side of the second race, and the second race has the bearing side protruding portion configured to protrude radially outward, and at least a part of a portion of the restricting member which faces the first race or the rolling body is located radially inward of the distal end of the bearing side protruding portion.

Therefore, in an assembling operation of the structure with a thrust bearing, when the first race and the second race are erroneously assembled, the restricting member and the bearing side protruding portion of the second race collide with each other, and thus an erroneous assembling operation is prevented.

Further, in addition to providing the restricting member and the bearing side protruding portion, the member to be supplied to which the lubricating fluid is supplied is disposed radially outward of the thrust bearing to face the second race. Therefore, the lubricating fluid supplied to the thrust bearing is discharged from the inside of the thrust bearing by a centrifugal force, passes between a surface of the bearing side protruding portion of the second race on the rolling body and first race side and a surface of the restricting member on the second race side and then is accommodated in the member to be supplied.

Since the lubricating fluid passes through between the surface of the bearing side protruding portion of the second race on the rolling body and first race side and the surface of the restricting member on the second race side, a discharge direction of the lubricating fluid from the thrust bearing is restricted to a radially outward direction. Therefore, the lubricating fluid is prevented from being spread in an unintended direction, and thus a sufficient amount of the lubricating fluid is stably supplied to a member to be supplied which is located radially outward.

Therefore, according to the structure with a thrust bearing of the disclosure, erroneous assembling operation can be prevented during the assembling operation, and a sufficient amount of the lubricating fluid can be stably supplied to the member to be supplied after the assembling operation.

Further, in the structure with a thrust bearing of the disclosure, the member to be supplied may have a member to be supplied-side protruding portion (for example, a protruding portion 21b in the embodiment, the same below) configured to protrude radially inwardly on a side of the second race opposite to a first race side, and a distal end of the member to be supplied-side protruding portion may be located radially outward of the distal end of the bearing side protruding portion.

When such a member to be supplied-side protruding portion is provided in the member to be supplied, a concave portion into which the bearing side protruding portion of the second race is fitted in an axial direction is formed by the member to be supplied and the restricting member. Therefore, the lubricating fluid accommodated in the member to be supplied is prevented from being spread, and thus an even greater amount of the lubricating fluid is stably supplied to the member to be supplied. Further, since the distal end of the member to be supplied-side protruding portion is located radially outward of the distal end of the bearing side protruding portion, the assembling operation is not obstructed by the member to be supplied-side protruding portion.

Hereinafter, a vehicle in which a transmission having a structure with a thrust bearing according to an embodiment is mounted will be described with reference to the drawings.

As illustrated in FIG. 1, in a vehicle V, an engine E (for example, an internal combustion engine, or a driving source, alternatively, an electric motor may be used in place of the engine E) is mounted sideways in a vehicle body so that a crankshaft 1 is directed in a vehicle body leftward/rightward direction. A driving force output from the engine E is transmitted to a power transmission device PT. Then, the power transmission device PT adjusts the driving force of the engine E in accordance with a selected gear shift ratio and transmits the adjusted driving force to a left front wheel WFL and a right front wheel WFR.

The power transmission device PT includes an automatic transmission 3 having a torque converter 2 connected to the crankshaft 1 and a front differential gear 4 connected to the automatic transmission 3. The front differential gear 4 is connected to the left front wheel WFL and the right front wheel WFR via a front left axle 5L and a front right axle 5R.

Figure 2:
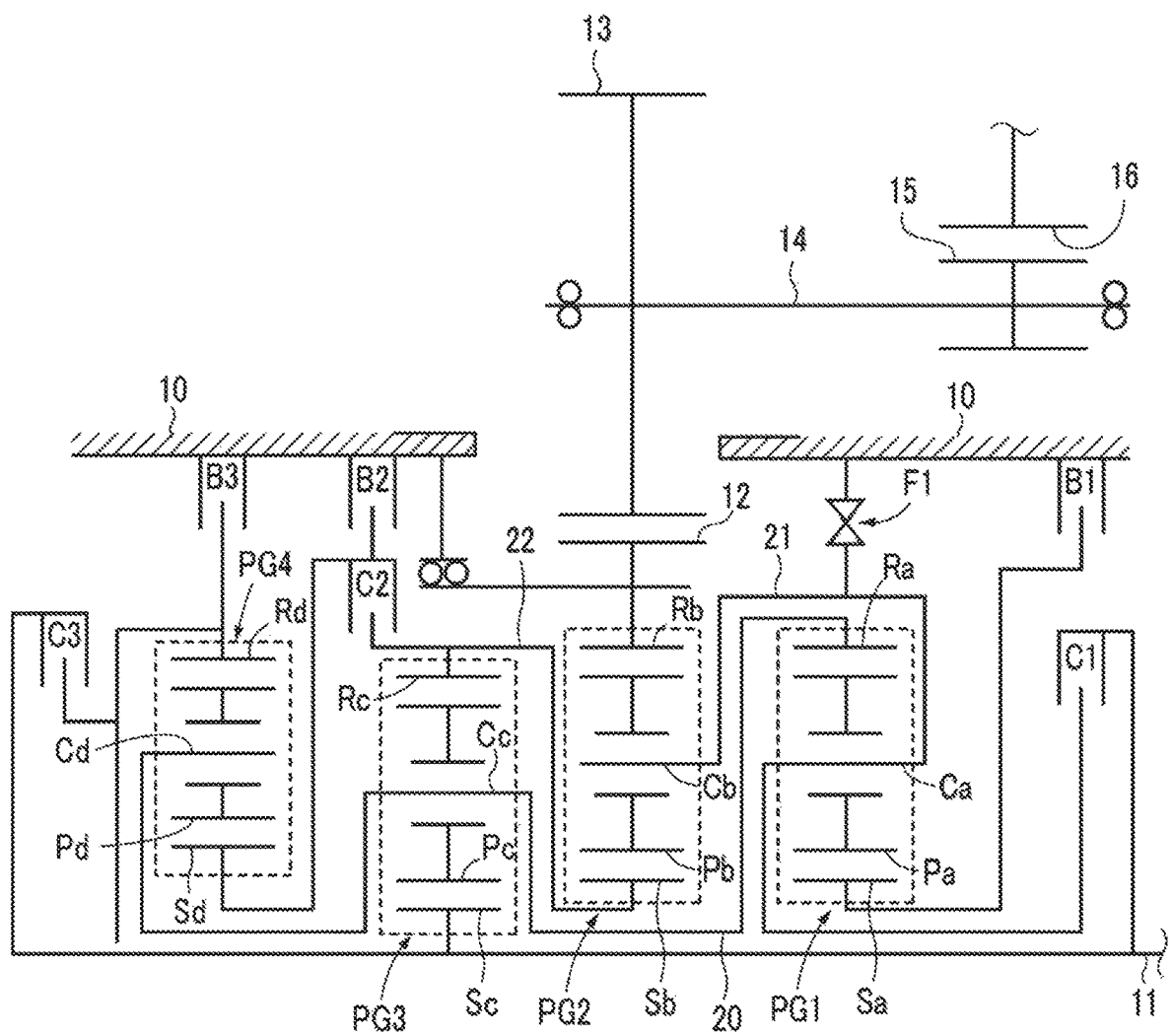
FIG. 2 is a skeleton diagram illustrating a transmission mounted in the vehicle of FIG. 1.

FIG. 2 is a skeleton diagram illustrating a part of the automatic transmission 3 excluding the torque converter 2. The automatic transmission 3 includes an input shaft 11 as an input member pivotally supported inside a transmission case 10 as a casing to be rotatable, and an output member 12 which is an output gear disposed concentrically with the input shaft 11.

The driving force output from the engine E is transmitted to the input shaft 11 via the torque converter 2 having a lock-up clutch and a damper.

Rotation of the output member 12 is transmitted to the left and right driven wheels (the left front wheel WFL and the right front wheel WFR) of the vehicle via an idle gear 13 engaged with the output member 12, an idle shaft 14 which pivotally supports the idle gear 13, a final drive gear 15 pivotally supported by the idle shaft 14, and a final driven gear 16 provided at the front differential gear 4 and engaged with the final drive gear 15.

Further, in the power transmission device PT, a single plate type or multiple plate type starting clutch configured to be frictionally engageable may be provided in place of the torque converter 2. Furthermore, when a propeller shaft instead of the front differential gear 4 is connected, the power transmission device PT may also be applied to a rear wheel drive vehicle in which a left rear wheel WRL and a right rear wheel WRR are driven. Also, the power transmission device PT may also be applied to a four-wheel drive vehicle by connecting a propeller shaft to the front differential gear 4 via a transfer.

A first planetary gear mechanism PG1, a second planetary gear mechanism PG2, a third planetary gear mechanism PG3 and a fourth planetary gear mechanism PG4 are disposed concentrically with the input shaft 11 in this order from the engine E side inside the transmission case 10 as the casing of the automatic transmission 3.

The third planetary gear mechanism PG3 is configured as a so-called single pinion type planetary gear mechanism having a sun gear Sc, a ring gear Re, and a carrier Cc pivotally supporting a pinion Pc, which is engaged with the sun gear Sc and the ring gear Re, rotatably and revolvingly.

In a so-called single pinion type planetary gear mechanism, when the carrier is fixed and the sun gear is rotated, the ring gear rotates in a direction different from that of the sun gear, and thus the so-called single pinion type planetary gear mechanism is also referred to as a minus planetary gear mechanism or a negative planetary gear mechanism. Also, in a so-called single pinion type planetary gear mechanism, when the ring gear is fixed and the sun gear is rotated, the carrier rotates in the same direction as that of the sun gear.

Figure 3:
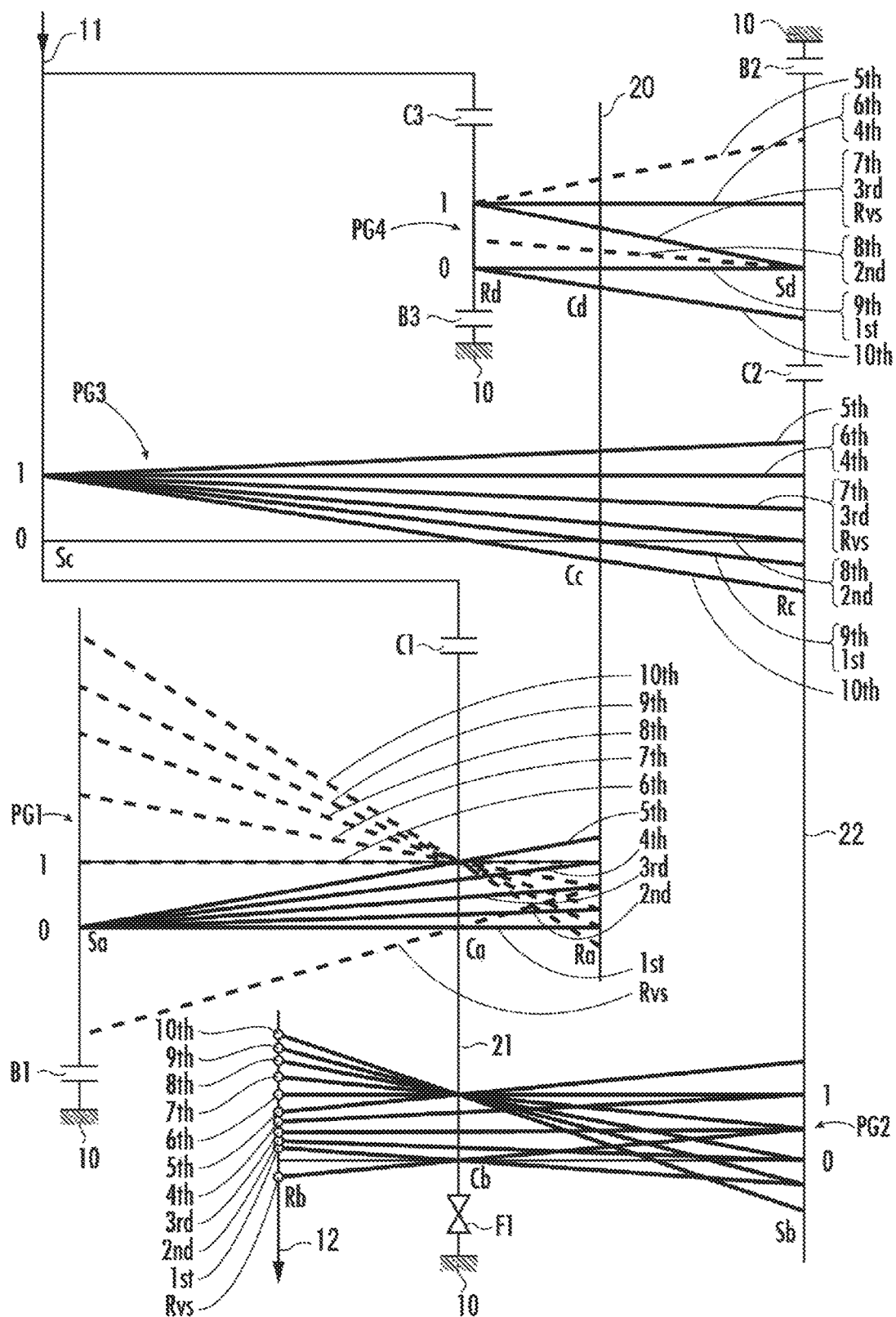
FIG. 3 is an alignment chart of a planetary gear mechanism of the transmission of FIG. 2.

An alignment chart (a diagram in which ratios between relative rotational speeds of three elements including the sun gear, the carrier and the ring gear can be expressed by a straight line (speed line)) illustrated in a second part from the top in FIG. 3 is an alignment chart of the third planetary gear mechanism PG3. As illustrated in the alignment chart, when it is assumed that the sun gear Sc, the carrier Cc and the ring gear Rc which are three elements of the third planetary gear mechanism PG3 are a first element, a second element and a third element from a left side in an arrangement order at intervals corresponding to a gear ratio (the number of teeth of the ring gear/the number of teeth of the sun gear) in the alignment chart, the first element is the sun gear Sc, the second element is the carrier Cc, and the third element is the ring gear Re.

Here, a ratio between a distance from the sun gear Sc to the carrier Cc and a distance from the carrier Cc to the ring gear Rc is set to h:1, wherein h is the gear ratio of the third planetary gear mechanism PG3. Also, in the alignment chart, a lower horizontal line and an upper horizontal line (lines overlapping 4th and 6th) indicate that the rotational speeds are "0" and "1" (the same rotational speed as that of the input shaft 11).

The fourth planetary gear mechanism PG4 is also configured as a so-called single pinion type planetary gear mechanism having a sun gear Sd, a ring gear Rd, and a carrier Cd pivotally supporting a pinion Pd, which is engaged with the sun gear Sd and the ring gear Rd, rotatably and revolvingly.

An alignment chart illustrated in a first part (uppermost part) from the top in FIG. 3 is an alignment chart of the fourth planetary gear mechanism PG4. As illustrated in the alignment chart, when it is assumed that the sun gear Sd, the carrier Cd and the ring gear Rd which are three elements of the fourth planetary gear mechanism PG4 are a fourth element, a fifth element and a sixth element from a left side in an arrangement order at intervals corresponding to a gear ratio in the alignment chart, the fourth element is the ring gear Rd, the fifth element is the carrier Cd, and the sixth element is the sun gear Sd.

Here, a ratio between a distance from the sun gear Sd to the carrier Cd and a distance from the carrier Cd to the ring gear Rd is set to i:1, wherein i is the gear ratio of the fourth planetary gear mechanism PG4.

The first planetary gear mechanism PG1 is also configured as a so-called single pinion type planetary gear mechanism having a sun gear Sa, a ring gear Ra, and a carrier Ca pivotally supporting a pinion Pa, which is engaged with the sun gear Sa and the ring gear Ra, rotatably and revolvingly.

An alignment chart illustrated in a third part from the top in FIG. 3 is an alignment chart of the first planetary gear mechanism PG1. As illustrated in the alignment chart, when it is assumed that the sun gear Sa, the carrier Ca and the ring gear Ra which are three elements of the first planetary gear mechanism PG1 are a seventh element, an eighth element and a ninth element from a left side in an arrangement order at intervals corresponding to a gear ratio in the alignment chart, the seventh element is the sun gear Sa, the eighth element is the carrier Ca, and the ninth element is the ring gear Ra.

Here, a ratio of a distance from the sun gear Sa to the carrier Ca and a distance from the carrier Ca to the ring gear Ra is set to j:1, wherein j is the gear ratio of the first planetary gear mechanism PG1.

The second planetary gear mechanism PG2 is also configured as a so-called single pinion type planetary gear mechanism having a sun gear Sb, a ring gear Rb, and a carrier Cb pivotally supporting a pinion Pb, which is engaged with the sun gear Sb and the ring gear Rb, rotatably and revolvingly.

An alignment chart illustrated in a fourth part (lowermost part) from the top in FIG. 3 is an alignment chart of the second planetary gear mechanism PG2. As illustrated in the alignment chart, when it is assumed that the sun gear Sb, the carrier Cb and the ring gear Rb which are three elements of the second planetary gear mechanism PG2 are a tenth element, an eleventh element and a twelfth element from a left side in an arrangement order at intervals corresponding to a gear ratio in the alignment chart, the tenth element is the ring gear Rb, the eleventh element is the carrier Cb, and the twelfth element is the sun gear Sb.

Here, a ratio of a distance from the sun gear Sb to the carrier Cb and a distance from the carrier Cb to the ring gear Rb is set to k:1, wherein k is the gear ratio of the second planetary gear mechanism PG2.

The sun gear Sc (first element) of the third planetary gear mechanism PG3 is connected to the input shaft 11. Further, the ring gear Rb (tenth element) of the second planetary gear mechanism PG2 is connected to the output member 12 configured as the output gear.

Also, the carrier Cc (second element) of the third planetary gear mechanism PG3, the carrier Cd (fifth element) of the fourth planetary gear mechanism PG4 and the ring gear Ra (ninth element) of the first planetary gear mechanism PG1 are connected to each other, and a first connected body Cc-Cd-Ra is formed.

Also, the ring gear Rc (third element) of the third planetary gear mechanism PG3 and the sun gear Sb (twelfth element) of the second planetary gear mechanism PG2 are connected to each other, and a second connected body Re-Sb is formed.

Also, the carrier Ca (eighth element) of the first planetary gear mechanism PG1 and the earlier Cb (eleventh element) of the second planetary gear mechanism PG2 are connected to each other, and a third connected body Ca-Cb is formed.

Further, the automatic transmission 3 has seven engagement mechanisms which includes three clutches which are a first clutch C1, a second clutch C2 and a third clutch C3, three brakes which are a first brake B1, a second brake B2 and a third brake B3, and a one two-way clutch F1.

The first clutch C1 is a hydraulically actuated wet multiple disk clutch. Due to the first clutch C1, the third planetary gear mechanism PG3 is configured to be switchable between a connected state in which the sun gear Sc (first element) and the third connected body Ca-Cb are connected and an open state in which the connection is disconnected.

The third clutch C3 is a hydraulically actuated wet multiple disk clutch. Due to the third clutch C3, the third planetary gear mechanism PG3 is configured to be switchable between a connected state in which the sun gear Sc (first element) and the ring gear Rd (fourth element) of the fourth planetary gear mechanism PG4 are connected and an open state in which the connection is disconnected.

The second clutch C2 is a hydraulically actuated wet multiple disk clutch. Due to the second clutch C2, the fourth planetary gear mechanism PG4 is configured to be switchable between a connected state in which the sun gear Sd (sixth element) and the second connected body Rc-Sb are connected and an open state in which the connection is disconnected.

The two-way clutch F1 also serves as a fourth brake B4. The two-way clutch F1 is configured to be switchable between a reverse rotation prevention state in which normal rotation (rotation in the same direction as a rotation direction of the input shaft 11 and the output member 12) of the third connected body Ca-Cb is allowed and reverse rotation is prevented and a fixed state in which the third connected body Ca-Cb is fixed to the transmission case 10.

In the reverse rotation prevention state, when a force intended to cause rotation in a normal rotation direction is applied to the third connected body Ca-Cb, rotation is allowed, and the two-way clutch F1 is brought into the open state. On the other hand, when a force intended to cause rotation in a reverse rotation direction is applied, rotation is blocked, and the two-way clutch F1 is brought into the fixed state in which the third connected body Ca-Cb is fixed to the transmission case 10.

The first brake B1 is a hydraulically actuated wet multiple disk brake. Due to the first brake B1, the first planetary gear mechanism PG1 is configured to be switchable between a fixed state in which the sun gear Sa (seventh element) is fixed to the transmission case 10 and an open state in which the fixed state is released.

The second brake B2 is a hydraulically actuated wet multiple disk brake. Due to the second brake B2, the fourth planetary gear mechanism PG4 is configured to be switchable between a fixed state in which the sun gear Sd (sixth element) is fixed to the transmission case 10 and an open state in which the fixed state is released.

The third brake B3 is a hydraulically actuated wet multiple disk brake. Due to the third brake B3, the fourth planetary gear mechanism PG4 is configured to be switchable between a fixed state in which the ring gear Rd (fourth element) is fixed to the transmission case 10 and an open state in which the fixed state is released.

The switching of the three clutches of the first clutch C1, the second clutch C2 and the third clutch C3, the three brakes of the first brake B1, the second brake B2 and the third brake B3, and one two-way clutch F1 is controlled by an electronic control unit (ECU) (refer to FIG. 1) including a transmission control unit (TCU) on the basis of vehicle information such as a traveling speed of a vehicle transmitted from an integrated control unit which is not illustrated.

The electronic control unit (ECU) includes an electronic unit composed of a CPU, a memory or the like which is not illustrated. The electronic control unit (ECU) receives predetermined vehicle information such as a traveling speed of the vehicle V or an opening degree of an accelerator, a rotational speed or an output torque of the engine E, operation information of a paddle shift lever 7, and so on and controls the automatic transmission 3 by executing a control program held in a storage device such as a memory by a CPU.

As illustrated in FIG. 1, the paddle shift lever 7 is provided on a handle 6 of the vehicle V, and the paddle shift lever 7 has a right paddle 7u and a left paddle 7d. When the right paddle 7u is pulled forward, upshifting is performed by a manual operation, and when the left paddle 7d is pulled forward, downshifting is performed by the manual operation. An operation signal of the paddle shift lever 7 is transmitted to the electronic control unit (ECU).

Further, an operational unit for performing a manual operation is not limited to a paddle shift lever. For example, a shift lever disposed between a driver's seat and a passenger's seat or a button disposed on the handle may be used as an operational unit.

As illustrated in FIG. 2, the first clutch C1, the first planetary gear mechanism PG1, the second planetary gear mechanism PG2, the third planetary gear mechanism PG3, the second clutch C2, the fourth planetary gear mechanism PG4 and the third clutch C3 are disposed on an axial line of the input shaft 11 in this order from the engine E and torque converter 2 side.

Additionally, the third brake B3 is disposed radially outward of the fourth planetary gear mechanism PG4, the second brake B2 is disposed radially outward of the second clutch C2, the first brake B1 is disposed radially outward of the first clutch C1, and the two-way clutch F1 is disposed radially outward of the first planetary gear mechanism PG1.

As described above, in the automatic transmission 3, the first brake B1, the second brake B2, the third brake B3 and the two-way clutch F1 are disposed radially outside of the planetary gear mechanism or the clutch. Therefore, an axial length of the automatic transmission 3 is shortened as compared with the case in which the first brake B1, the second brake B2, the third brake B3 and the two-way clutch F1 are disposed parallel to each other together with the planetary gear mechanism on the axial line of the input shaft 11.

Further, even if the third brake B3 is disposed radially outward of the third clutch C3 and the second brake B2 is disposed radially outward of the fourth planetary gear mechanism PG4, it is also possible to shorten the axial length.

Next, a case in which each gear shift stage of the automatic transmission 3 of the embodiment is established will be described with reference to FIG. 3 and FIG. 4.

Further, a speed line indicated by a broken line in FIG. 3 indicates that elements of other planetary gear mechanisms rotate (idle) by following a planetary gear mechanism which transmits power among the first planetary gear mechanism PG1, the second planetary gear mechanism PG2, the third planetary gear mechanism PG3 and the fourth planetary gear mechanism PG4.

FIG. 4 is a diagram collectively illustrating states of the three clutches of the first clutch C1, the second clutch C2 and the third clutch C3, the three brakes of the first brake B1, the second brake B2 and the third brake B3, and one two-way clutch F1 in each gear shift stage which will be described later.

In this drawing, "0" in a row of each of the first clutch C1, the second clutch C2, the third clutch C3, the first brake B1, the second brake B2 and the third brake B3 indicates a connected state or a fixed state, and a blank indicates an open state. Also, "R" in a row of the two-way clutch F1 indicates a reverse rotation prevention state, and "L" indicates a fixed state.

Further, underlined "R" and "L" indicate that the rotational speed of the third connected body Ca-Cb becomes "0" due to an action of the two-way clutch F1. Also, "R/L" indicates a state that is a reverse rotation prevention state "R" normally but switched to a fixed state "L" when an engine brake is applied.

Further, FIG. 4 indicates a gear shift ratio (rotational speed of the input shaft 11/rotational speed of the output member 12) in each gear shift stage and a common ratio (a ratio of gear ratios between gear shift stages; a value obtained by dividing a gear shift ratio of a predetermined gear shift stage by a gear shift ratio of a gear shift stage that is one gear shift stage higher than the predetermined gear shift stage) in the case in which the gear ratio h of the third planetary gear mechanism PG3 is 2.734, the gear ratio i of the fourth planetary gear mechanism PG4 is 1.614, the gear ratio j of the first planetary gear mechanism PG1 is 2.681, and the gear ratio k of the second planetary gear mechanism PG2 is 1.914. Accordingly, it can be understood that common ratio can be appropriately set.

When a first gear stage is established, the two-way clutch F1 is brought into the reverse rotation prevention state (R in FIG. 4), and the first brake B1 and the second brake B2 are brought into a fixed state.

By setting the two-way clutch F1 to be in the reverse rotation prevention state R and setting the first brake B1 to be in the fixed state, the reverse rotation of the third connected body Ca-Cb and the sun gear Sa (seventh element) of the first planetary gear mechanism PG1 is prevented, and the rotational speed of the third connected body Ca-Cb and the sun gear Sa (seventh element) of the first planetary gear mechanism PG1 becomes "0".

Accordingly, the sun gear Sa (seventh element), the carrier Ca (eighth element), and the ring gear Ra (ninth element) of the first planetary gear mechanism PG1 are brought into a locked state in which relative rotation is impossible, and the rotational speed of the first connected body Cc-Cd-Ra including the ring gear Ra (ninth element) of the first planetary gear mechanism PG1 also becomes "0".

Then, the rotational speed of the ring gear Rb (tenth element) of the second planetary gear mechanism PG2 to which the output member 12 is connected becomes "1st" illustrated in FIG. 3, and the first gear stage is established.

Also, in order to establish the first gear stage, it is not necessary to set the second brake B2 in the fixed state. However, to smoothly shift from the first gear stage to a second gear stage which will be described later, the second brake B2 is fixed in the first gear stage. Further, when the engine brake is applied in the first gear stage, the two-way clutch F1 may be switched from the reverse rotation prevention state R to the fixed state L.

When the second gear stage is established, the two-way clutch F1 is set to be in the reverse rotation prevention state R, the first brake B1 and the second brake B2 are set to be in the fixed state, and the second clutch C2 is set to be in the connected state.

By setting the two-way clutch F1 to be the reverse rotation prevention state, normal rotation of the third connected body Ca-Cb is allowed. Further, by setting the first brake B1 to be the fixed state, the rotational speed of the sun gear Sa (seventh element) of the first planetary gear mechanism PG1 becomes "0". Furthermore, by setting the second brake B2 to be the fixed state, the rotational speed of the sun gear Sd (sixth element) of the fourth planetary gear mechanism PG4 becomes "0".

Also, by setting the second clutch C2 to be in the connected state, the rotational speed of the second connected body Rc-Sb becomes "0" which is the same speed as the rotational speed of the sun gear Sd (sixth element) of the fourth planetary gear mechanism PG4.

Then, the rotational speed of the ring gear Rb (tenth element) of the second planetary gear mechanism PG2 to which the output member 12 is connected becomes "2nd" illustrated in FIG. 3, and the second gear stage is established.

When a third gear stage is established, the two-way clutch F1 is set to be in the reverse rotation prevention state, the first brake B1 and the second brake B2 are set to be in the fixed state, and the third clutch C3 is set to be the connected state.

By setting the two-way clutch F1 to be in the reverse rotation prevention state, normal rotation of the third connected body Ca-Cb is allowed. Further, by setting the first brake B1 to be in the fixed state, the rotational speed of the sun gear Sa (seventh element) of the first planetary gear mechanism PG1 becomes "0". Furthermore, by setting the second brake B2 to be in the fixed state, the rotational speed of the sun gear Sd (sixth element) of the fourth planetary gear mechanism PG4 becomes "0".

Also, by setting the third clutch C3 to be the connected state, the rotational speed of the ring gear Rd (fourth element) of the fourth planetary gear mechanism PG4 becomes "1" which is the same speed as the rotational speed of the sun gear Sc (first element) of the third planetary gear mechanism PG3 connected to the input shaft 11.

Accordingly, since the rotational speed of the sun gear Sd (sixth element) of the fourth planetary gear mechanism PG4 becomes "0" and the rotational speed of the ring gear Rd (fourth element) becomes "1", the rotational speed of the carrier Cd (fifth element), that is, the rotational speed of the first connected body Cc-Cd-Ra becomes i/(i+1).

Additionally, the rotational speed of the ring gear Rb (tenth element) of the second planetary gear mechanism PG2 to which the output member 12 is connected becomes "3rd" illustrated in FIG. 3, and the third gear stage is established.

When a fourth gear stage is established, the two-way clutch F1 is set to be in the reverse rotation prevention state, the first brake B1 is set to be in the fixed state, and the second clutch C2 and the third clutch C3 are set to be in the connected state.

By setting the two-way clutch F1 to be in the reverse rotation prevention state, normal rotation of the third connected body Ca-Cb is allowed. Further, by setting the first brake B1 to be in the fixed state, the rotational speed of the sun gear Sa (seventh element) of the first planetary gear mechanism PG1 becomes "0".

Further, by setting the second clutch C2 to be in the connected state, the sun gear Sd (sixth element) of the fourth planetary gear mechanism PG4 and the second connected body Rc-Sb rotate at the same speed. Therefore, between the third planetary gear mechanism PG3 and the fourth planetary gear mechanism PG4, the carrier Cc (second element) and the carrier Cd (fifth element) are connected, and the ring gear Rc (third element) and the sun gear Sd (sixth element) are connected. Therefore, in the fourth gear stage in which the second clutch C2 is in the connected state, one alignment chart including four elements formed by the third planetary gear mechanism PG3 and the fourth planetary gear mechanism PG4 can be drawn.

Also, by setting the third clutch C3 to be in the connected state, the rotational speed of the ring gear Rd (fourth element) of the fourth planetary gear mechanism PG4 becomes "1" which is the same speed as the rotational speed of the sun gear Sc (first element) of the third planetary gear mechanism PG3, and the rotational speeds of two elements among the four elements formed by the third planetary gear mechanism PG3 and the fourth planetary gear mechanism PG4 become the same speed of "1".

Accordingly, each of the elements of the third planetary gear mechanism PG3 and the fourth planetary gear mechanism PG4 is in the locked state in which relative rotation is not possible, and the rotational speed of all the elements of the third planetary gear mechanism PG3 and the fourth planetary gear mechanism PG4 becomes "1". Also, the rotational speed of the third connected body becomes j/(j+1).

Additionally, the rotational speed of the ring gear Rb (tenth element) of the second planetary gear mechanism PG2 to which the output member 12 is connected becomes "4th" illustrated in FIG. 3, and the fourth gear stage is established.

When a fifth gear stage is established, the two-way clutch F1 is set to be in the reverse rotation prevention state, the first brake B1 is set to be in the fixed state, and the first clutch C1 and the third clutch C3 are set to be in the connected state.

By setting the two-way clutch F1 to be in the reverse rotation prevention state, normal rotation of the third connected body Ca-Cb is allowed. Further, by setting the first brake B1 to be in the fixed state, the rotational speed of the sun gear Sa (seventh element) of the first planetary gear mechanism PG1 becomes "0".

Further, by setting the first clutch C1 to be in the connected state, the rotational speed of the third connected body Ca-Cb becomes "1" which is the same speed as the rotational speed of the sun gear Sc (the first element) of the third planetary gear mechanism PG3.

Additionally, the rotational speed of the ring gear Rb (tenth element) of the second planetary gear mechanism PG2 to which the output member 12 is connected becomes "5th" illustrated in FIG. 3, and the fifth gear stage is established.

Also, to establish the fifth gear stage, it is not necessary to set the third clutch C3 to be in the connected state. However, in the fourth gear stage and a sixth gear stage which will be described later, it is necessary to set the third clutch C3 in the connected state, and thus the fifth gear stage is also set to be in the connected state such that downshifting from the fifth gear stage to the fourth gear stage and upshifting from the fifth gear stage to the sixth gear stage which will be described later can be performed smoothly.

When the sixth gear stage is established, the two-way clutch F1 is set to be in the reverse rotation prevention state R, and the first clutch C1, the second clutch C2 and the third clutch C3 are set to be in the connected state.

By setting the two-way clutch F1 to be in the reverse rotation prevention state, normal rotation of the third connected body Ca-Cb is allowed.

Further, by setting the second clutch C2 and the third clutch C3 to be in the connected state, each of the elements of the third planetary gear mechanism PG3 and the fourth planetary gear mechanism PG4 is in a locked state in which relative rotation is not possible, and the rotational speed of the second connected body Rc-Sb becomes "1" as described for the fourth gear stage. Furthermore, by setting the first clutch C1 to be the connected state, the rotational speed of the third connected body Ca-Cb becomes "1".

As a result, the rotational speeds of the carrier Cb (eleventh element) and the sun gear Sb (twelfth element) of the second planetary gear mechanism PG2 become the same speed of "1", and each of the elements is in the locked state in which relative rotation is not possible.

Additionally, the rotational speed of the ring gear Rb (tenth element) of the second planetary gear mechanism PG2 to which the output member 12 is connected becomes "6th" illustrated in FIG. 3, and the sixth gear stage is established.

When a seventh gear stage is established, the two-way clutch F1 is set to be in the reverse rotation prevention state, the second brake B2 is set to be in the fixed state, and the first clutch C1 and the third clutch C3 are set to be in the connected state.

By setting the two-way clutch F1 to be in the reverse rotation prevention state, normal rotation of the third connected body Ca-Cb is allowed. Further, by setting the second brake B2 to be in the fixed state, the rotational speed of the sun gear Sd (sixth element) of the fourth planetary gear mechanism PG4 becomes "0".

Also, by setting the third clutch C3 to be in the connected state, the rotational speed of the ring gear Rd (fourth element) of the fourth planetary gear mechanism PG4 becomes "1" which is the same speed as the rotational speed of the sun gear Sc (first element) of the third planetary gear mechanism PG3, and the rotational speed of the first connected body Cc-Cd-Ra including the carrier Cd (fifth element) of the fourth planetary gear mechanism PG4 becomes $i/(i+1)$. Further, by setting the first clutch C1 to be in the connected state, the rotational speed of the third connected body Ca-Cb becomes "1" which is the same speed as the rotational speed of the sun gear Sc (first element) of the third planetary gear mechanism PG3 connected to the input shaft 11.

Additionally, the rotational speed of the ring gear Rb (tenth element) of the second planetary gear mechanism PG2 to which the output member 12 is connected becomes "7th" illustrated in FIG. 3, and the seventh gear stage is established.

When an eighth gear stage is established, the two-way clutch F1 is set to be in the reverse rotation prevention state, the second brake B2 is set to be in the fixed state, and the first clutch C1 and the second clutch C2 are set to be in the connected state.

By setting the two-way clutch F1 to be in the reverse rotation prevention state, normal rotation of the third connected body Ca-Cb is allowed. Further, by setting the second brake B2 to be in the fixed state, the rotational speed of the sun gear Sd (sixth element) of the fourth planetary gear mechanism PG4 becomes "0".

Further, by setting the second clutch C2 to be in the connected state, the rotational speed of the second connected body Rc-Sb becomes "0" which is the same speed as the rotational speed of the sun gear Sd (sixth element) of the fourth planetary gear mechanism PG 4. Also, by setting the first clutch C1 to be in the connected state, the rotational speed of the third connected body Ca-Cb becomes "1" which is the same speed as the rotational speed of the sun gear Sc (first element) of the third planetary gear mechanism PG3.

Additionally, the rotational speed of the ring gear Rb (tenth element) of the second planetary gear mechanism PG2 to which the output member 12 is connected becomes "8th" illustrated in FIG. 3, and the eighth gear stage is established.

When a ninth gear stage is established, the two-way clutch F1 is set to be in the reverse rotation prevention state, the second brake B2 and the third brake B3 are set to be in the fixed state, and the first clutch C1 is set to be in the connected state.

By setting the two-way clutch F1 to be in the reverse rotation prevention state, normal rotation of the third connected body Ca-Cb is allowed. Further, by setting the second brake B2 to be in the fixed state, the rotational speed of the sun gear Sd (sixth element) of the fourth planetary gear mechanism PG4 becomes "0". Also, by setting the third brake B3 to be in the fixed state, the rotational speed of the ring gear Rd (fourth element) of the fourth planetary gear mechanism PG4 also becomes "0".

Accordingly, the sun gear Sd (sixth element), the carrier Cd (fifth element), and the ring gear Rd (fourth element) of the fourth planetary gear mechanism PG4 are in the locked state in which relative rotation is not possible, and the rotational speed of the first connected body Cc-Cd-Ra including the carrier Cd (fifth element) of the fourth planetary gear mechanism PG4 also becomes "0".

Further, by setting the first clutch C1 to be in the connected state, the rotational speed of the third connected body Ca-Cb becomes "1" which is the same speed as the rotational speed of the sun gear Sc (first element) of the third planetary gear mechanism PG3.

Additionally, the rotational speed of the ring gear Rb (tenth element) of the second planetary gear mechanism PG2 to which the output member 12 is connected becomes "9th" illustrated in FIG. 3, and the ninth gear stage is established.

When the tenth gear stage is established, the two-way clutch F1 is set to be in the reverse rotation prevention state R, the third brake B3 is set to in the fixed state, and the first clutch C1 and the second clutch C2 are set to be in the connected state.

By setting the two-way clutch F1 to be in the reverse rotation prevention state, normal rotation of the third connected body Ca-Cb is allowed. Also, by setting the third brake B3 to be in the fixed state, the rotational speed of the ring gear Rd (fourth element) of the fourth planetary gear mechanism PG4 becomes "0".

Further, by setting the second clutch C2 to be in the connected state, the second connected body Rc-Sb and the sun gear Sd (sixth element) of the fourth planetary gear mechanism PG4 rotate at the same speed. Also, by setting the first clutch C1 to be in the connected state, the rotational speed of the third connected body Ca-Cb becomes "1" which is the same speed as the rotational speed of the sun gear Sc (the first element) of the third planetary gear mechanism PG3.

Additionally, the rotational speed of the ring gear Rb (tenth element) of the second planetary gear mechanism PG2 to which the output member 12 is connected becomes "10th" illustrated in FIG. 3, and the tenth gear stage is established.

When a reverse gear stage is established, the two-way clutch F1 is set to be in the fixed state (L in FIG. 4), the second brake B2 is set to be in the fixed state, and the third clutch C3 is set to be in the connected state.

By setting the second brake B2 to be in the fixed state and setting the third clutch C3 to be connected state, the rotational speed of the first connected body Cc-Cd-Ra becomes i/(i+1). Further, by setting the two-way clutch F1 to be in the fixed state, the rotational speed of the third connected body Ca-Cb becomes "0".

Additionally, the rotational speed of the ring gear Rb (tenth element) of the second planetary gear mechanism PG2 to which the output member 12 is connected becomes "Rvs" illustrated in FIG. 3, and the reverse gear stage is established.

Next, a structure with a thrust bearing which is provided inside the automatic transmission 3 will be described with reference to FIG. 5 and FIG. 6. Further, arrows in FIG. 6 indicate flows of lubricating oil as a lubricating fluid.

Figure 5:
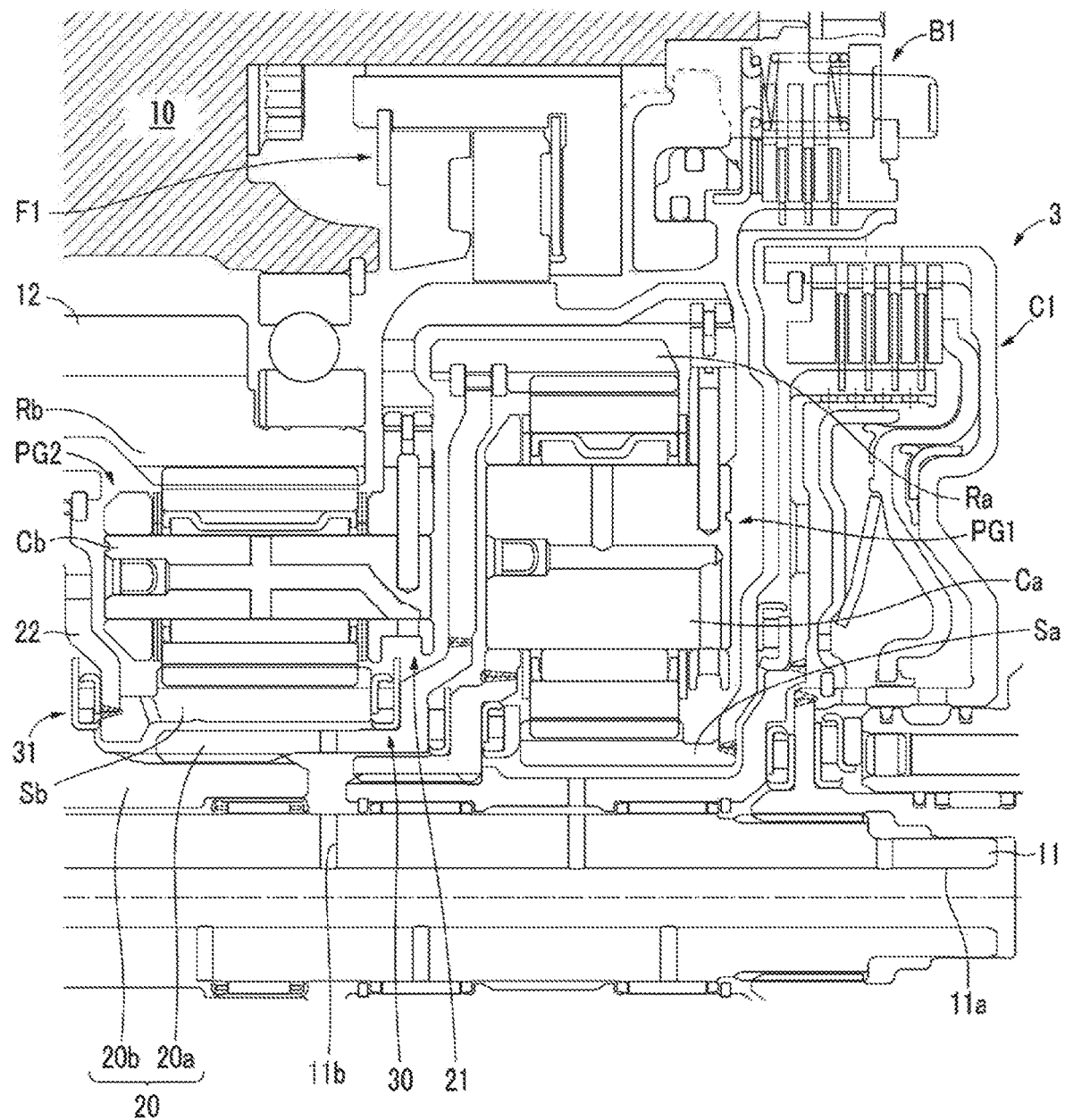
FIG. 5 is an enlarged cross-sectional view illustrating a structure in the vicinity of the structure with a thrust bearing in the transmission of FIG. 2.

As illustrated in FIG. 5, the input shaft 11 to which the driving force from the engine E is transmitted has a first communication passage 11a which extends in a rotational central axial line direction thereof, and a second communication passage 11b which extends in a radial direction to allow an internal space of the first communication passage 11a and a space outside of the input shaft 11 to communicate with each other.

The lubricating oil as the lubricating fluid is supplied to the input shaft 11 from a supply source (not illustrated). The lubricating oil supplied to the input shaft 11 is supplied to the second planetary gear mechanism PG 2, a first thrust bearing 30 and a second thrust bearing 31 which will be described later via the first communication passage 11a and the second communication passage 11b. That is, a lubricating oil supply mechanism includes the input shaft 11 and the supply source.

A first connecting member 20 which connects the carrier Cc, the carrier Cd and the ring gear Ra to form the first connected body Cc-Cd-Ra is pivotally supported by the input shaft 11 to be rotatable (refer to FIGS. 2 and 3).

The first connecting member 20 includes a ring gear side member 20a (second member) connected to the ring gear Ra of the first planetary gear mechanism PG1, and a carrier side member 20b connected to the carrier Cc of the third planetary gear mechanism PG3. The ring gear side member 20a and the carrier side member 20b are spline-coupled to each other. Further, the carrier side member 20b is pivotally supported by the input shaft 11 to be rotatable.

Both of the first connecting member 20 and the second planetary gear mechanism PG2 are rotatable about the rotational central axial line of the input shaft 11 as a rotational central axis. That is, the carrier side member 20b of the first connecting member 20 and the sun gear Sb of the second planetary gear mechanism PG2 are relatively rotatable about the same rotational central axial line.

Since the ring gear side member 20a of the first connecting member 20 and the sun gear Sb (first member) of the second planetary gear mechanism PG2 are disposed close to each other, an annular first thrust bearing 30 which receives a thrust load generated therebetween is arranged therebetween.

Figure 6:
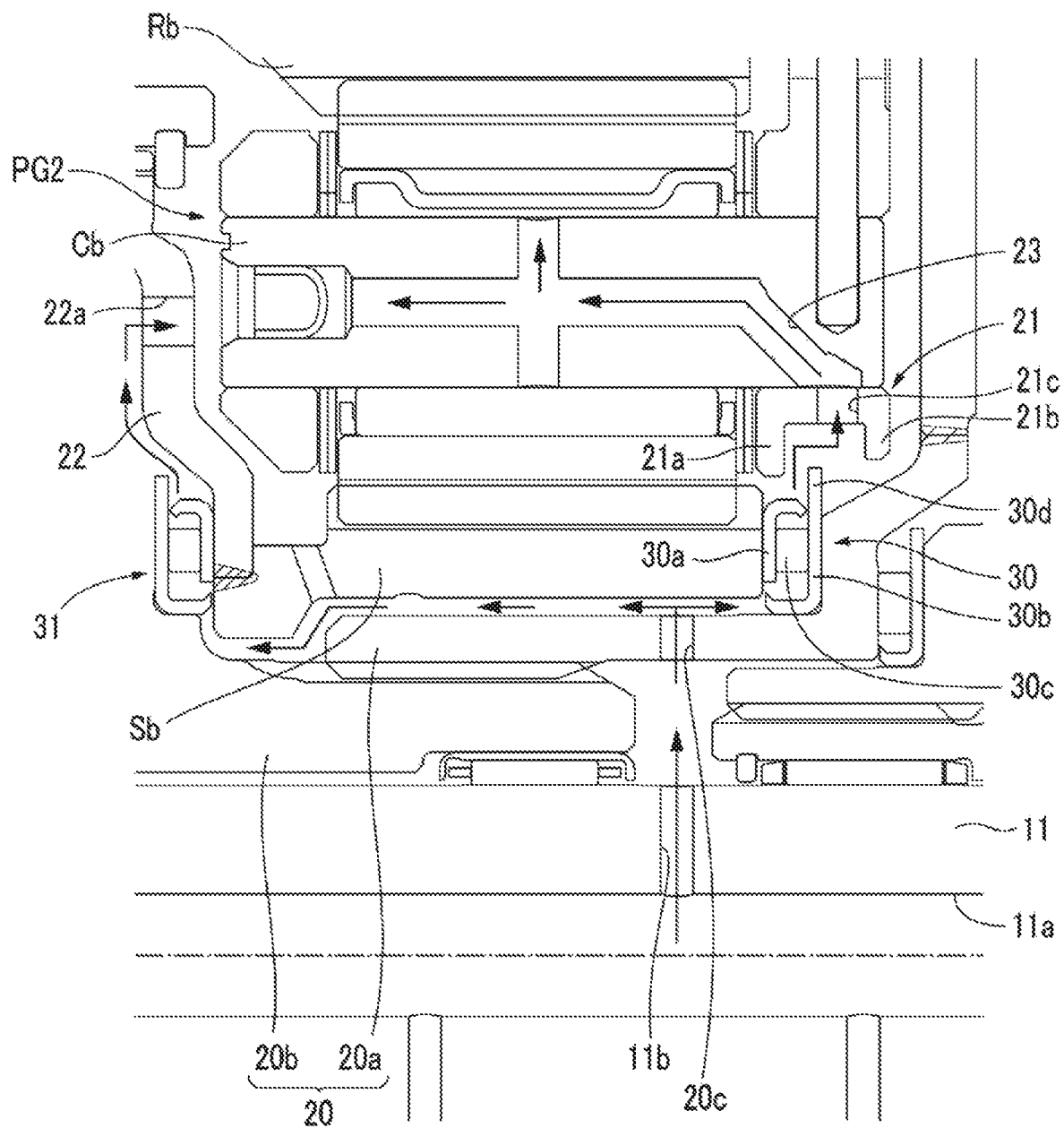
FIG. 6 is an enlarged cross-sectional view illustrating a main part of the structure with a thrust bearing of FIG. 5.

As illustrated in FIG. 6, the first thrust bearing 30 includes an annular first race 30a which is in contact with the sun gear Sb, an annular second race 30b which is in contact with the ring gear side member 20a, and a cylindrical rolling body 30c disposed between the first race 30a and the second race 30b.

Further, the cylindrical rolling body 30c is disposed radially (that is, so that a direction of an axial line of the rolling body 30c coincides with a radial direction of the first thrust bearing 30) in the first thrust bearing 30. However, the rolling body of the disclosure is not limited to a cylindrical shape, and a spherical shape may be used.

Both of the first race 30a and the second race 30b are configured as L-shaped members each of which has a longitudinal portion extending in the radial direction of the first thrust bearing 30 and a short portion extending in the axial direction. The rolling body 30c is disposed in an internal space formed by arranging the first race 30a and the second race 30b to face each other.

The longitudinal portion of the second race 30b is formed to be longer than the longitudinal portion of the first race 30a. Therefore, in the first thrust bearing 30, a distal end of the longitudinal portion of the second race 30b protrudes radially outward as a flange portion 30d (bearing side protruding portion).

A second connecting member 21 (member to be supplied) which connects the carrier Ca and the carrier Cb to form the third connected body Ca-Cb is located on a radially outer side of the first thrust bearing 30. Specifically, an end of the second connecting member 21 on the carrier Cb side is disposed to face the first thrust bearing 30.

In an end of the second connecting member 21 on the carrier Cb side, a restricting portion 21a is formed at a position facing a part of the first race 30a and the rolling body 30c on the rolling body 30c side of the second race 30b in a direction of an axial line of the first thrust bearing 30 to protrude radially inward of the first thrust bearing 30.

A distal end of the restricting portion 21a (that is, a portion facing a part of the first race 30a and the rolling body 30c) is located radially inward of a distal end of the flange portion 30d of the first thrust bearing 30.

Since the first connecting member 20, the second connecting member 21 and the first thrust bearing 30 are configured as described above, in the structure with a thrust bearing which includes these, when the first race 30a and the second race 30b are erroneously assembled (more specifically, so that the first race 30a and the second race 30b are reversed in the axial direction) during an assembling operation, the restricting portion 21a and the flange portion 30d collide with each other, and thus erroneous assembly is prevented.

Further, in the above-described structure with a thrust bearing, the restricting portion 21a is provided at a position facing a part of the first race 30a and the rolling body 30c. However, the restricting member of the disclosure only needs to be disposed on the radially outer side of the thrust bearing and also at a position facing the first race or the rolling body on the rolling body side of the second race.

That is, the restricting member only needs to be disposed not to come into contact with the flange portion which is the bearing side protruding portion when an assembling operation is correctly performed. Therefore, for example, the restricting portion 21a may be provided at a position facing only the first race 30a or only the rolling body 30c.

Further, the restricting member of the disclosure does not necessarily include a member protruding from a predetermined portion. For example, like a third connecting member 22 (member connecting the sun gear Sb and the ring gear Rc) facing the second thrust bearing 31, a portion which is inclined from the second race side toward the first race side to be radially inward may be used as the restricting member.

Moreover, the lubricating oil discharged from the input shaft 11 is supplied to the first thrust bearing 30 through a through-hole 20c formed in the ring gear side member 20a of the first connecting member 20. The lubricating oil supplied to the first thrust bearing 30 passes through an inside of the first thrust bearing 30 and is discharged to the outside of the first thrust bearing 30.

At this time, a discharge direction of the lubricating oil discharged from the first thrust bearing 30 is restricted to radially outwards through a surface of the flange portion 30d of the first thrust bearing 30 (that is, by passing through between a surface of the flange portion 30d of the second race 30b on the rolling body 30c and first race 30a side and a surface of the restricting portion 21a on the second race 30b side).

Therefore, the lubricating oil is prevented from being diffused in an unintended direction, and thus a sufficient amount of lubricating oil is stably supplied to the end of the second connecting member 21 on the carrier Cb side which is located radially outside of the first thrust bearing 30.

Here, in the end of the second connecting member 21 on the carrier Cb side, the restricting portion 21a is formed at a position facing a part of the first race 30a and the rolling body 30c on the rolling body 30c side of the second race 30b in the direction of the axial line of the first thrust bearing 30 to protrude radially inward.

In addition to this, a protruding portion 21b (member to be supplied-side protruding portion) protruding inward in the radial direction is provided on the second race 30b side opposite to the first race 30a side at the end of the second connecting member 21 on the carrier Cb side. That is, a concave portion into which the flange portion 30d of the first thrust bearing 30 is fitted in the axial direction is formed by the protruding portion 21b and the restricting portion 21a.

Further, in the end of the second connecting member 21 on the carrier Cb side, a first introduction hole 21c which allows an internal flow passage 23 of the carrier Cb to communicate with a space outside thereof is formed between the restricting portion 21a and the protruding portion 21b (that is, a bottom of the concave portion formed by the protruding portion 21b and the restricting portion 21a).

Therefore, the lubricating oil supplied from the first thrust bearing 30 to the end of the second connecting member 21 on the carrier Cb side is accommodated in the concave portion formed by the protruding portion 21b and the restricting portion 21a and is then guided to the internal flow passage 23 of the carrier Cb through the first introduction hole 21c formed at the bottom of the concave portion. As a result, the lubricating oil supplied from the first thrust bearing 30 to the end of the second connecting member 21 on the carrier Cb side is guided to the carrier Cb without being diffused.

Further, a distal end of the protruding portion 21b is located radially outward of the distal end of the flange portion 30d of the first thrust bearing 30 (that is, the radially outermost portion of the first thrust bearing 30). Accordingly, the protruding portion 21b does not obstruct the assembling operation of the first thrust bearing 30.

Further, in the above-described structure with a thrust bearing, the restricting portion 21a (restricting member) and the protruding portion 21b are formed on the end (member to be supplied) of the second connecting member 21 on the carrier Cb side which receives the lubricating oil discharged from the first thrust bearing 30.

However, the member to be supplied of the disclosure may be disposed to face the second race on the radially outer side of the thrust bearing, and also the restricting member may be disposed on the radially outer side of the thrust bearing and also at a position facing the first race or the rolling body on the rolling body side of the second race. Therefore, the restricting portion may be a member independent from the member to be supplied. In addition, the protruding portion 21b may be omitted.

For example, in the third connecting member 22 located radially outside the second thrust bearing 31, the lubricating oil discharged from the second thrust bearing 31 is guided to the second introduction hole 22a formed to be directed in the axial direction through the surface thereof. In the third connecting member 22 having such a configuration, when the member to be supplied-side protruding portion is provided on a side of the second race opposite to the first race side, the flow of the lubricating oil is obstructed, and thus the member to be supplied-side protruding portion is not provided.

As described above, according to the structure with a thrust bearing in the automatic transmission 3 of the embodiment, when the first thrust bearing 30 and the second thrust bearing 31 are assembled, the erroneous assembling operation can be prevented, and a sufficient amount of lubricating oil can be stably supplied to the second connecting member 21 and the third connecting member 22 after the assembling operation. It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A structure with a thrust bearing, wherein the structure has a first member and a second member configured to be relatively rotatable about the same rotational central axial line, and the thrust bearing disposed between the first member and the second member, the structure comprising:
   a supply mechanism, comprising an input shaft, configured to supply a lubricating fluid to an inside of the thrust bearing, a third member to which the lubricating fluid discharged from the thrust bearing is supplied, and the third member having a restricting member extending from the third member,
   wherein the thrust bearing includes an annular first race which is in contact with the first member, an annular second race which is in contact with the second member, and a rolling body disposed between the first race and the second race, the third member is disposed radially outward of the thrust bearing to face the second race, the restricting member is disposed radially outward of the thrust bearing and also at a position facing the first race or the rolling body on a rolling body side of the second race, the second race has a first protruding portion configured to protrude radially outward in parallel with a contact portion of the first race in contact with the first member, and a tip of at least a portion of the restricting member which faces the first race or the rolling body has an internal radius less than an external radius of a tip of the first protruding portion, the third member has a second protruding portion configured to protrude radially inwardly on a side of the second race opposite to the rolling body side, and a receiving portion located between the restricting member and the second protruding portion and facing the first protruding portion radially outside the thrust bearing, and the receiving portion is provided with an oil passage that guides the lubricating fluid discharged and supplied from the thrust bearing to an object to be lubricated.

2. The structure according to claim 1, wherein:

a tip of the second protruding portion has an internal radius greater than the external radius of the tip of the first protruding portion.

\* \* \* \* \*